United States Patent
Suzuki

(10) Patent No.: US 10,529,999 B2
(45) Date of Patent: Jan. 7, 2020

(54) POWER SUPPLY APPARATUS, POWER SUPPLY SYSTEM, AND POWER SUPPLY METHOD

(71) Applicant: KYOCERA CORPORATION, Kyoto-shi, Kyoto (JP)

(72) Inventor: Yuki Suzuki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 97 days.

(21) Appl. No.: 15/520,955

(22) PCT Filed: Oct. 19, 2015

(86) PCT No.: PCT/JP2015/005263
§ 371 (c)(1),
(2) Date: Apr. 21, 2017

(87) PCT Pub. No.: WO2016/063517
PCT Pub. Date: Apr. 28, 2016

(65) Prior Publication Data
US 2017/0346116 A1  Nov. 30, 2017

(30) Foreign Application Priority Data
Oct. 23, 2014 (JP) .................. 2014-216507

(51) Int. Cl.
 *H01M 8/04* (2016.01)
 *H01M 8/04858* (2016.01)
 (Continued)

(52) U.S. Cl.
 CPC ......... *H01M 8/04858* (2013.01); *H01M 8/12* (2013.01); *H01M 10/44* (2013.01); *H02J 3/38* (2013.01); *H02J 7/34* (2013.01)

(58) Field of Classification Search
 CPC ........... H01M 8/04; H01M 8/12; H01M 10/44
 See application file for complete search history.

(56) References Cited

U.S. PATENT DOCUMENTS 6,503,649 B1 * 1/2003 Czajkowski ...... H01M 8/04947
429/430
2004/0033398 A1 2/2004 Kearl et al.
(Continued)

FOREIGN PATENT DOCUMENTS

| JP | H09-215225 A | 8/1997 |
| JP | 2002-083619 A | 3/2002 |

(Continued)

OTHER PUBLICATIONS

International Search Report dated Dec. 28, 2015, issued by Japan Patent Office for International Application No. PCT/JP2015/005263.

(Continued)

*Primary Examiner* — Kenneth J Douyette
(74) *Attorney, Agent, or Firm* — Procopio Cory Hargreaves and Savitch LLP

(57) ABSTRACT

A power supply apparatus, a power supply system, and a power supply method increase the power generation efficiency of the system overall in a system that includes a plurality of power source units. A power supply apparatus operates distributed power sources in parallel, the distributed power sources including power source units, and supplies output power from the distributed power sources to a load. The power supply apparatus includes a controller that controls each power source unit so that output power from whichever of the power source units has higher power generation efficiency is prioritized to increase.

6 Claims, 5 Drawing Sheets

(51) Int. Cl.
    *H01M 8/12*     (2016.01)
    *H02J 7/34*     (2006.01)
    *H02J 3/38*     (2006.01)
    *H01M 10/44*     (2006.01)

(56) References Cited

U.S. PATENT DOCUMENTS

| | | | |
|---|---|---|---|
| 2005/0037249 A1* | 2/2005 | Zizelman | H01M 8/04007 |
| | | | 429/425 |
| 2005/0106429 A1* | 5/2005 | Keefer | H01M 8/04097 |
| | | | 429/410 |
| 2006/0147770 A1 | 7/2006 | Krause | |
| 2007/0054165 A1* | 3/2007 | Yoshida | B60K 6/46 |
| | | | 429/415 |

FOREIGN PATENT DOCUMENTS

| | | |
|---|---|---|
| JP | 2007-116805 A | 5/2007 |
| JP | 2007-194137 A | 8/2007 |
| JP | 2007-306661 A | 11/2007 |
| JP | 2008-527648 A | 7/2008 |

OTHER PUBLICATIONS

Written Opinion of the International Searching Authority dated Dec. 28, 2015, issued by Japan Patent Office for International Application No. PCT/JP2015/005263.

* cited by examiner

POWER SUPPLY APPARATUS, POWER SUPPLY SYSTEM, AND POWER SUPPLY METHOD

CROSS-REFERENCE TO RELATED APPLICATION

This application claims priority to and the benefit of Japanese Patent Application No. 2014-216507 filed Oct. 23, 2014, the entire contents of which are incorporated herein by reference.

TECHNICAL FIELD

The present disclosure relates to a power supply apparatus, a power supply system, and a power supply method. In greater detail, the present disclosure relates to a power supply apparatus that supplies power output by a plurality of distributed power sources such as a fuel cell, a power supply system in which a plurality of such power supply apparatuses are connected, and a power supply method in such a system.

BACKGROUND

In recent years, research has been done on a system that connects a plurality of distributed power sources, such as solar cells and fuel cells, as power generation apparatuses and supplies power generated by the power generation apparatuses. The power generation apparatuses used as these distributed power sources for example include fuel cells such as a Polymer Electrolyte Fuel Cell (PEFC) and a Solid Oxide Fuel Cell (SOFC). A system that uses a plurality of such fuel cells as distributed power sources has also been proposed.

For example, a system for parallel operation of a plurality of distributed power sources including a plurality of fuel cell units has been proposed (for example, see JP 2007-194137 A (PTL 1)). The system disclosed in PLT 1 stores the power generation amount at the time of rated operation for each of the plurality of fuel cells and calculates the total power generation amount by totaling the power generation amounts at the time of rated operation for the fuel cells determined to be currently driven.

CITATION LIST

Patent Literature

PTL 1: JP 2007-194137 A

SUMMARY

Technical Problem

In general, the power generation efficiency of the power source unit in an SOFC is relatively high, at approximately 50% to 70%. The operating temperature, however, needs to be a high temperature of approximately 700° C. to 1000° C. Hence, a relatively long startup time is required. On the other hand, the power generation efficiency of the power source unit in a PEFC is approximately 30% to 40%, but the operating temperature is a relatively low temperature of approximately 80° C. to 100° C. Hence, a relatively short startup time is sufficient.

Accordingly, in a system that includes both an SOFC and a PEFC as distributed power sources, upon starting to supply power, the PEFC with a low power generation efficiency finishes starting up and begins to generate power before startup of the SOFC with high power generation efficiency is complete. As a result, the SOFC with high power generation efficiency does not operate at maximum output, which is a factor that reduces the efficiency of the system overall.

Therefore, it would be helpful to provide a power supply apparatus, a power supply system, and a power supply method that increase the power generation efficiency of the system overall in a system that includes a plurality of power source units.

Solution to Problem

A power supply apparatus according to a first aspect of the present disclosure operates a plurality of distributed power sources in parallel, the plurality of distributed power sources including a plurality of power source units, and supplies output power from the plurality of distributed power sources to a load, the power supply apparatus including:

a controller configured to control each power source unit so that output power from whichever of the plurality of power source units has higher power generation efficiency is prioritized to increase.

A power supply system according to a second aspect of the present disclosure includes:

a plurality of distributed power sources including a plurality of power source units; and a power supply apparatus configured to operate the plurality of distributed power sources in parallel and to supply output power from the plurality of distributed power sources to a load;

such that the power supply apparatus comprises a controller configured to control each power source unit so that output power from whichever of the plurality of power source units has higher power generation efficiency is prioritized to increase.

A power supply method according to a third aspect of the present disclosure includes:

operating a plurality of distributed power sources in parallel, the plurality of distributed power sources including a plurality of power source units;

supplying output power from the plurality of distributed power sources to a load; and controlling each power source unit so that output power from whichever of the plurality of power source units has higher power generation efficiency is prioritized to increase.

DETAILED DESCRIPTION

The following describes an embodiment of the present disclosure with reference to the drawings.

Figure 1:
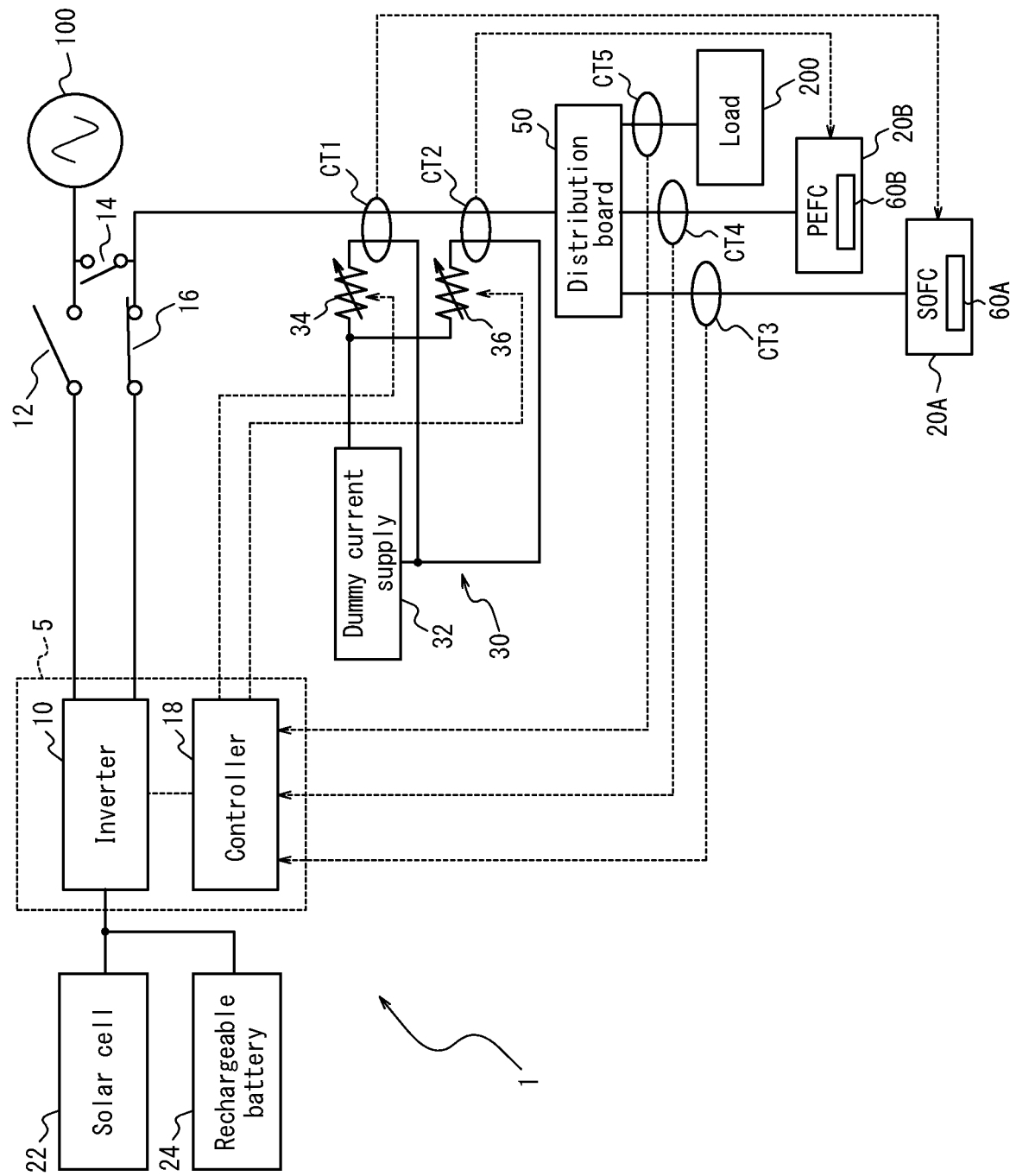
FIG. 1 is a functional block diagram schematically illustrating a power supply system according to one of the disclosed embodiments.

FIG. 1 is a functional block diagram schematically illustrating a power supply system that includes a power supply apparatus according to one of the embodiments of the present disclosure. In FIG. 1, solid lines mainly indicate the path of power, whereas dashed lines mainly indicate the path of control signals or signals that communicate a variety of information. Hereinafter, an explanation of elements and functional components that are well known is simplified or omitted as appropriate.

As illustrated in FIG. 1, a power supply system 1 according to one of the embodiments of the present disclosure is configured to include a power supply apparatus 5, a Solid Oxide Fuel Cell (SOFC) 20A, a Polymer Electrolyte Fuel Cell (PEFC) 20B, a solar cell 22, and a rechargeable battery 24. The power supply apparatus 5 according to this embodiment is also provided with an inverter 10 and a controller 18. In the following explanation, the solid oxide fuel cell is abbreviated as SOFC, and the polymer electrolyte fuel cell is abbreviated as PEFC.

FIG. 1 illustrates an example of the power supply system 1 being provided with the SOFC 20A, PEFC 20B, solar cell 22, and rechargeable battery 24 as a plurality of distributed power sources. The power supply system 1 according to this embodiment, however, may be configured to include any number, greater than one, of distributed power sources that include any number, greater than one, of power source units, for example such as fuel cells. In other words, as a minimum configuration, the power supply system 1 according to this embodiment can be configured to include only two distributed power sources, such as the SOFC 20A and the PEFC 20B. In other configurations, besides the plurality of distributed power sources such as the SOFC 20A and the PEFC 20B, the power supply system 1 according to this embodiment can be configured to include any additional number of distributed power sources. The power supply system 1 illustrated in FIG. 1 includes a plurality of distributed power sources constituted by the SOFC 20A, PEFC 20B, solar cell 22, and rechargeable battery 24. Among these, the SOFC 20A and the PEFC 20B constitute a plurality of distributed power sources that are fuel cells. As illustrated in FIG. 1, the SOFC 20A is configured to include a power source unit 60A of the fuel cell. Similarly, the PEFC 20B is configured to include a power source unit 60B of the fuel cell.

As illustrated in FIG. 1, the power supply apparatus 5 is connected to a plurality of distributed power sources, i.e. the SOFC 20A, PEFC 20B, solar cell 22, and rechargeable battery 24. The power supply apparatus 5 controls the power output by the plurality of distributed power sources and supplies the power to the load 200. The inverter 10 is interconnected to a grid 100 and converts power from DC to AC supplied to the load 200. The configuration by which the inverter 10 converts power in this way may be a similar configuration to that of a conventional power conditioner (inverter).

The inverter 10 of the power supply apparatus 5 converts the input DC power to AC power. The inverter 10 is provided with a DC/DC converter, a DC/AC inverter, and the like. The DC/DC converter performs adjustments such as stepping up or stepping down the DC power output from the distributed power sources such as the solar cell 22 and the rechargeable battery 24. The DC/AC inverter converts the DC power, the voltage of which was adjusted by the DC/DC converter, to AC power and outputs the result. As a bidirectional inverter, this inverter 10 can also for example convert AC power purchased from the grid 100 to DC power and charge the rechargeable battery 24 with the DC power. The DC/DC converter and DC/AC inverter can have a generally known configuration. Therefore, a detailed explanation is omitted.

The controller 18 of the power supply apparatus 5 controls and manages the power supply apparatus 5 overall, starting with the functional components of the power supply apparatus 5. The controller 18 may, for example, be configured by a microcomputer, a processor (CPU), or the like. The controller 18 is described below as being provided with a memory that stores a variety of programs and a variety of information. This memory also stores algorithms, a variety of reference tables such as lookup tables (LUT), and the like that are used for data analysis, various calculations, and the like performed by the controller 18.

By controlling the DC power input from the solar cell 22 and the rechargeable battery 24, the controller 18 can control the AC power that is output from the inverter 10. Also, by controlling the AC power input to the inverter 10, the controller 18 can control the DC power that charges the rechargeable battery 24. In particular, in this embodiment, by controlling the resistance of variable resistors 34 and 36 of the dummy current generation circuit 30 as described below, the controller 18 controls the current amount in the forward power flow direction generated by the dummy current generation circuit 30. The following mainly focuses on operations of the controller 18 and the like pertaining to control that is unique to this embodiment.

A switch 12 and a switch 14 are interconnected operation switches, and a switch 16 is an independent operation switch. The switches 12, 14, and 16 can be configured by relays, transistors, or the like. The switches 12, 14, and 16 are configured to allow switching between the on/off states based on a control signal from the controller 18. For such control, the switches 12, 14, and 16 are each connected to the controller 18, but this connection is omitted from FIG. 1.

The interconnected operation switch 12 switches interconnection on and off between the grid 100 and the solar cell 22 and rechargeable battery 24, which are distributed power sources. In other words, when the interconnected operation switch 12 is on, the output of the solar cell 22 and the rechargeable battery 24 is combined and is interconnected to the grid 100. When the interconnected operation switch 12 is off, the output of both the solar cell 22 and the rechargeable battery 24 is disconnected from the grid 100 and thus is not interconnected to the grid 100.

The interconnected operation switch 14 is switched in conjunction with the interconnected operation switch 12. Control to switch the interconnected operation switch 14 may be configured to be performed by a control signal from the controller 18, or the control signal for the interconnected operation switch 12 may be branched and supplied to the interconnected operation switch 14.

The independent operation switch 16 can shut off the path for supplying the output of the solar cell 22 and the rechargeable battery 24, which are distributed power sources, to the load 200 when the solar cell 22 and the rechargeable battery 24 are not interconnected to the grid 100. In other words, the independent operation switch 16 turns on when the interconnected operation switch 12 is off and the solar cell 22 and rechargeable battery 24 are disconnected from the grid 100. In this state, the power supply system 1 can perform independent operation by supplying the output from the solar cell 22 and the rechargeable battery 24 to the load 200.

The distributed power sources connected to the inverter 10 are interconnected to the grid 100 and output power to supply to the load 200. The grid 100 may be a general, commercial power grid. The distributed power sources according to the present disclosure may, for example, be configured to include a variety of fuel cells, such as the SOFC 20A and the PEFC 20B. In particular, in this embodiment, power source units (60A, 60B) included in the distributed power sources such as the SOFC 20A and the PEFC 20B preferably cannot sell generated power to the grid, i.e. preferably generate power that cannot be subjected to reverse power flow.

The "power that cannot be subjected to reverse power flow" is, for example, power generated by a fuel cell or power based on energy supplied from a rechargeable battery and is not allowed to be sold, for example as is the case currently in Japan. Accordingly, in this embodiment, the "power source unit" is preferably a different power generator from a power generator that can sell generated power to the grid, an example of which is the solar cell 22. As illustrated in FIG. 1, the case of the power source units being power source units 60A and 60B included in the SOFC 20A and the PEFC 20B is described below. The power source unit according to the present disclosure is not, however, limited to such a fuel cell and may be any power generator.

The power source units 60A and 60B included in the SOFC 20A and the PEFC 20B can generate power with a fuel cell power generation apparatus that causes gas, such as hydrogen, supplied from the outside to undergo an electrochemical reaction. The power source units 60A and 60B can then output the generated power. As illustrated in FIG. 1, the SOFC 20A and the PEFC 20B that include the power source units 60A and 60B are connected to the inverter 10 via a distribution board 50. In this embodiment, the power supply system 1 can supply power generated by the SOFC 20A and the PEFC 20B to the load 200 via the distribution board 50.

In this embodiment, the SOFC 20A and the PEFC 20B may be capable of independent operation, whereby at startup time, the SOFC 20A and the PEFC 20B start to operate upon receiving power from the grid 100 but then operate without receiving power from the grid 100 after starting up. In this embodiment, the SOFC 20A and the PEFC 20B are assumed to include other functional parts as necessary, such as a reformer, in order to allow independent operation. In this embodiment, the SOFC 20A and the PEFC 20B along with the power source units 60A and 60B can be configured by a generally known fuel cell, and therefore a more detailed description of the fuel cell is omitted.

The solar cell 22, which is a distributed power source, can generate power using sunlight and converts solar energy directly into power. In this embodiment, the solar cell 22 is assumed to generate power using sunlight with solar panels installed, for example, on the roof of a house. In the present disclosure, however, any type of solar cell 22 that can convert solar energy to power may be used. In FIG. 1, only one solar cell 22 is illustrated as an example, but any number of different types of solar cells may be connected.

The rechargeable battery 24, which is a distributed power source, supplies power by discharging the charged power. The rechargeable battery 24 can also charge with power supplied by the grid 100, the solar cell 22, or the like. In FIG. 1, only one rechargeable battery 24 is illustrated as an example, but any number of different types of rechargeable batteries may be connected.

Among the distributed power sources, the power generated by the solar cell 22 and the rechargeable battery 24 passes through the inverter 10 and can be supplied to a variety of loads 200 that consume power. The power from the inverter 10 is supplied to the load 200 through the distribution board 50. The load 200 may be any of a variety of apparatuses to which power is supplied from the power supply system 1, such as household appliances used by the user. In FIG. 1, the load 200 is illustrated as one member, but the load 200 may be any number of a variety of apparatuses.

As illustrated in FIG. 1, in the power supply system 1, the power generated by the solar cell 22 is joined with the power discharged by the rechargeable battery 24. In FIG. 1, the DC power output by the solar cell 22 and the rechargeable battery 24 is joined, but the power supply system 1 according to this embodiment is not limited to this configuration. The DC power may be joined after being converted to AC power. In this way, in the power supply system 1, the power output by the solar cell 22 and the rechargeable battery 24 is input into the inverter 10 of the power supply apparatus 5. With such a configuration, a plurality of distributed power sources can be caused to operate in parallel in this embodiment. In other words, in this embodiment, the power supply apparatus 5 operates a plurality of distributed power sources, including a plurality of power source units 20A and 20B, in parallel and supplies the output power from the plurality of distributed power sources to the load 200.

As illustrated in FIG. 1, the power supply system 1 according to this embodiment is provided with the dummy current generation circuit 30. The dummy current generation circuit 30 is provided with a dummy current supply 32 and variable resistors 34 and 36. As illustrated in FIG. 1, the dummy current supply 32 is connected in parallel to the variable resistors 34 and 36. With such a configuration, the dummy current generation circuit 30 can pass the current output by the dummy current supply 32 to the variable resistors 34 and 36. By making the resistance variable, the variable resistors 34 and 36 can change the current flowing therein. The variable resistors 34 and 36 are connected to the controller 18 of the power supply apparatus 5. By variably controlling the resistance of the variable resistors 34 and 36, the controller 18 can adjust the current flowing in the variable resistors 34 and 36.

Current sensors CT1 to CT5 are sensors that detect the current flowing in the power supply line. The current sensors CT1 to CT5 may, for example, be a Current Transformer (CT). Any element that can detect current, however, may be used as the current sensors CT1 to CT5.

As illustrated in FIG. 1, the current sensors CT1 and CT2 are disposed at locations that can detect the current of forward power flow when the power supply system 1 is in interconnected operation. In other words, as illustrated in FIG. 1, the CT1 and the CT2 are provided between the grid 100 and the distribution board 50 when the switch 14 is on. As used here, current of forward power flow refers to the current flowing from the grid 100 to the power supply system 1. Current of reverse power flow is opposite from the forward power flow, i.e. the current flowing from the power supply system 1 to the grid 100. In FIG. 1, the current of forward power flow detected by the current sensors CT1 and CT2 is current flowing from the grid 100 in the direction of the distribution board 50.

As illustrated in FIG. 1, the current sensor CT1 is connected to the SOFC 20A, which is a distributed power source. The current sensor CT2 is connected to the PEFC 20B, which is a distributed power source. With such a configuration, the results of detection by the current sensors CT1 and CT2 can be notified respectively to the SOFC 20A and the PEFC 20B. The current sensors CT1 and CT2 are configured to be capable of communicating by a wired or wireless connection with the SOFC 20A and the PEFC 20B respectively.

The power generated by fuel cells such as the SOFC 20A and the PEFC 20B cannot currently be sold to the grid in Japan. Accordingly, fuel cells such as the SOFC 20A and the PEFC 20B are configured not to generate power when current of reverse power flow is detected. In greater detail, the SOFC 20A and the PEFC 20B are configured to generate power only when current of forward power flow having a predetermined value or higher is detected. In other words, the plurality of power source units 60A and 60B may output power while the current sensors CT1 and CT2 connected to the plurality of power source units 60A and 60B detect current of forward power flow. In this way, the SOFC 20A and the PEFC 20B control whether or not power can be generated and the amount of power generated, based on the current detected by the current sensors CT1 and CT2.

As illustrated in FIG. 1, the current sensor CT1 also detects current flowing in the variable resistor 34 of the dummy current generation circuit 30. The current sensor CT2 also detects current flowing in the variable resistor 36 of the dummy current generation circuit 30. As described above, in the dummy current generation circuit 30, the variable resistors 34 and 36 can adjust the current generated by the dummy current generation circuit 30. Accordingly, for example if the power supply from the grid 100 ceases because of a power outage or the like, then even while the power supply system 1 is performing independent operation, the dummy current generation circuit 30 can generate power in the forward power flow direction so that the current sensors CT1 and CT2 detect current of forward power flow.

In this way, in the power supply system 1, the SOFC 20A and the PEFC 20B can generate power even when forward flowing power from the grid 100 is not actually being supplied. In the power supply system 1, the controller 18 can control the amount of power generated by the SOFC 20A and the PEFC 20B by using the variable resistors 34 and 36 to control the current generated by the dummy current generation circuit 30. Also, the controller 18 can, in advance, acquire or calculate the correlation between the resistance of the variable resistors 34 and 36, the current detected by the current sensors CT1 and CT2, and the output of power generated by the SOFC 20A and the PEFC 20B. The controller 18 can then store this correlation, for example in an internal memory.

The current sensor CT3 detects current output from the SOFC 20A. Therefore, the current sensor CT3 is disposed at a location that can detect current flowing between the SOFC 20A and the distribution board 50, as illustrated in FIG. 1. The current sensor CT4 detects current output from the PEFC 20B. Therefore, the current sensor CT4 is disposed at a location that can detect current flowing between the PEFC 20B and the distribution board 50, as illustrated in FIG. 1. The current sensor CT5 detects current supplied to the load 200. Therefore, the current sensor CT5 is disposed at a location that can detect current flowing between the distribution board 50 and the load 200, as illustrated in FIG. 1. The current sensors CT3 to CT5 are configured to be capable of communicating by a wired or wireless connection with the controller 18. With such a configuration, the current sensors CT3 to CT5 can notify the controller 18 of the results of detection.

Next, the operations of the power supply system 1 according to this embodiment are described.

Figure 2:
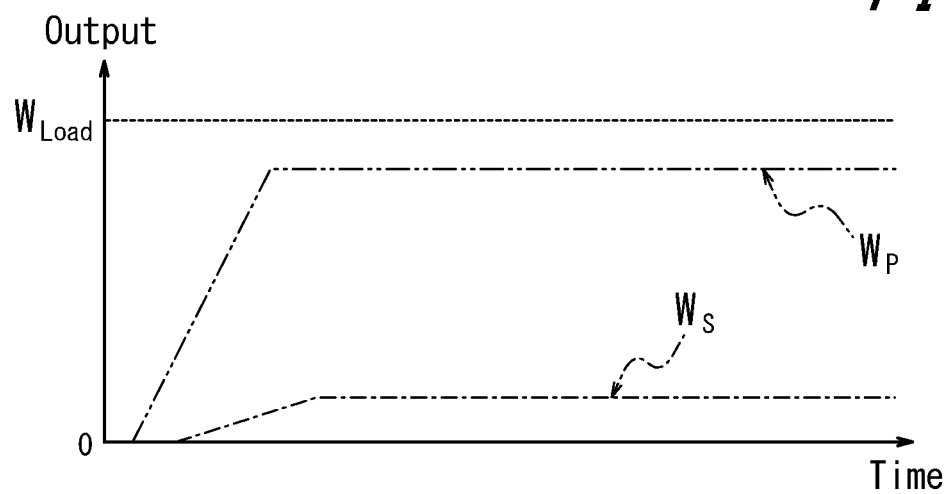
FIG. 2 illustrates an example of operations of a conventional power supply apparatus.

FIG. 2 illustrates control normally performed at the time of startup in a conventional power supply system that includes an SOFC and a PEFC. The example in FIG. 2 shows the SOFC and the PEFC initiating startup at the time of the origin O and subsequently represents the change over time in the power output by the SOFC and the PEFC. In FIG. 2, the power output by the SOFC is indicated as Ws, and the power output by the PEFC is indicated as Wp. The power consumption required by the load 200 is indicated in FIG. 2 as Wload. In FIG. 2, the power consumption of the load 200 (Wload) is assumed not to exceed the sum of the maximum output of the SOFC and the maximum output of the PEFC. Also, as illustrated in FIG. 2, when the SOFC and the PEFC initiate startup at the same time, the PEFC, which has a relatively short startup time, begins to output power first, and the SOFC, which has a relatively long startup time, begins to output power next.

As illustrated in FIG. 2, when the SOFC and the PEFC initiate startup at the same time, the PEFC that outputs Wp can finish starting up relatively quickly and supply power at the maximum output, since the startup rate is fast. Before the SOFC that outputs Ws can finish starting up and reach maximum output, the PEFC that outputs Wp is already supplying a large amount of power to the load. In this way, in a system that includes an SOFC and a PEFC, the PEFC with low power generation efficiency starts to output before the SOFC with high power generation efficiency starts to output when these fuel cells initiate startup. As a result, the SOFC with high power generation efficiency does not reach a state of continuously operating at maximum output, thereby reducing the efficiency of the system overall.

Accordingly, in this embodiment, the power supply apparatus 5 controls the output power from the SOFC 20A and the PEFC 20B so that output from the SOFC 20A with higher power generation efficiency is prioritized to increase. Also, in this embodiment, for a predetermined time from startup of the SOFC 20A and the PEFC 20B, output may be prioritized to increase starting with the fuel cell having a shorter startup time, such as the PEFC 20B.

Figure 3:
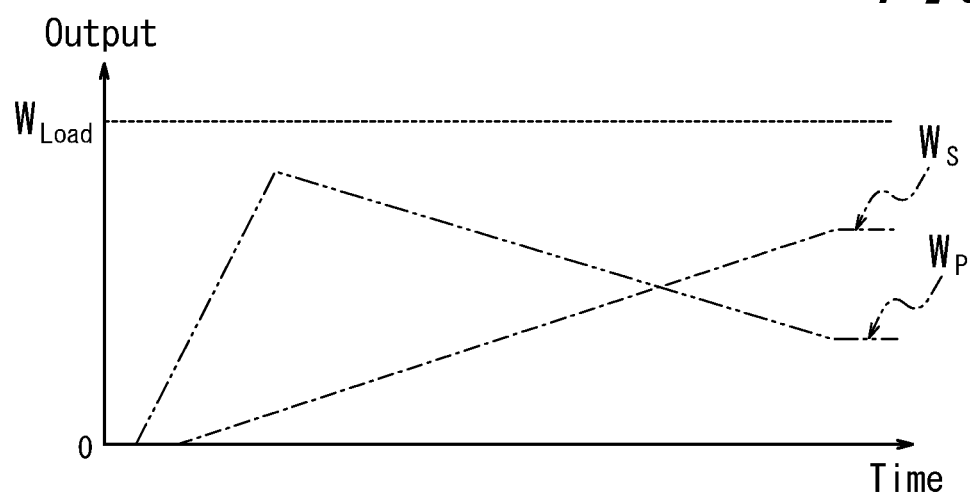
FIG. 3 illustrates an example of operations of a power supply apparatus according to one of the embodiments of the present disclosure.

FIG. 3 illustrates control performed at the time of startup in the power supply system 1 according to this embodiment, which includes the SOFC 20A and the PEFC 20B. The meaning of the labels in FIG. 3 is the same as in FIG. 2. In FIG. 3, the power consumption of the load 200 (Wload) is assumed not exceed the sum of the maximum output of the SOFC 20A and the maximum output of the PEFC 20B.

As illustrated in FIG. 3, when the SOFC 20A and the PEFC 20B initiate startup at the same time, the PEFC 20B that outputs Wp starts to output before the SOFC 20A that outputs Ws, as in the example illustrated in FIG. 2. In this embodiment, however, the output power of each of the SOFC 20A and the PEFC 20B is controlled so that output from the SOFC 20A with higher power generation efficiency is prioritized to increase. Therefore, the SOFC 20A and the PEFC 20B are controlled so that the SOFC 20A is always prioritized to output at maximum power. With such control, the power Ws follows the power Wp, and once the power yielded by adding Ws and Wp reaches the power consumption of the load 200 (Wload), the power Ws of the SOFC 20A is prioritized, and the power Wp of the PEFC 20B is reduced. Accordingly, the power Ws exceeds the power Wp at a certain point in time, and the SOFC 20A can supply power by maintaining the maximum output within the power consumption of the load 200 (Wload).

In this embodiment, the control to increase Ws and the control to decrease Wp shown in FIG. 3 can be performed during independent operation by controlling the current detected by the current sensors CT1 and CT2 via the controller 18 adjusting the resistance of the variable resistors 34 and 36.

In this way, in this embodiment, the controller 18 controls the output power from each of the plurality of power source units 60A and 60B so that output from whichever of the plurality of power source units 60A and 60B has higher power generation efficiency (for example, 60A) is prioritized to increase. During independent operation of the power supply apparatus 5, the controller 18 may control the output power from the plurality of power source units 60A and 60B by controlling the current that is detected by each of the current sensors CT1 and CT2.

In this embodiment, the controller 18 may perform control for a predetermined time from startup of the plurality of power source units 60A and 60B so that output from whichever of the plurality of power source units 60A and 60B has a shorter startup time (for example, 60B) is prioritized to increase. Here, the "predetermined time from startup of the plurality of power source units 60A and 60B" may, for example, be from the time that startup of the plurality of power source units 60A and 60B initiates until when the total output power from the plurality of power source units 60A and 60B reaches the power consumption of the load 200.

According to this embodiment, the output from the SOFC 20A with high efficiency can be fully utilized. Therefore, according to this embodiment, the power generation efficiency of the system overall in a system that includes a plurality of power source units can be increased. Also, according to this embodiment, by combined use of the SOFC 20A that starts up slowly but has high efficiency and the PEFC 20B that has low efficiency but starts up quickly, the fuel cells compensate for each other's weaknesses, thereby accelerating startup.

Figure 5:
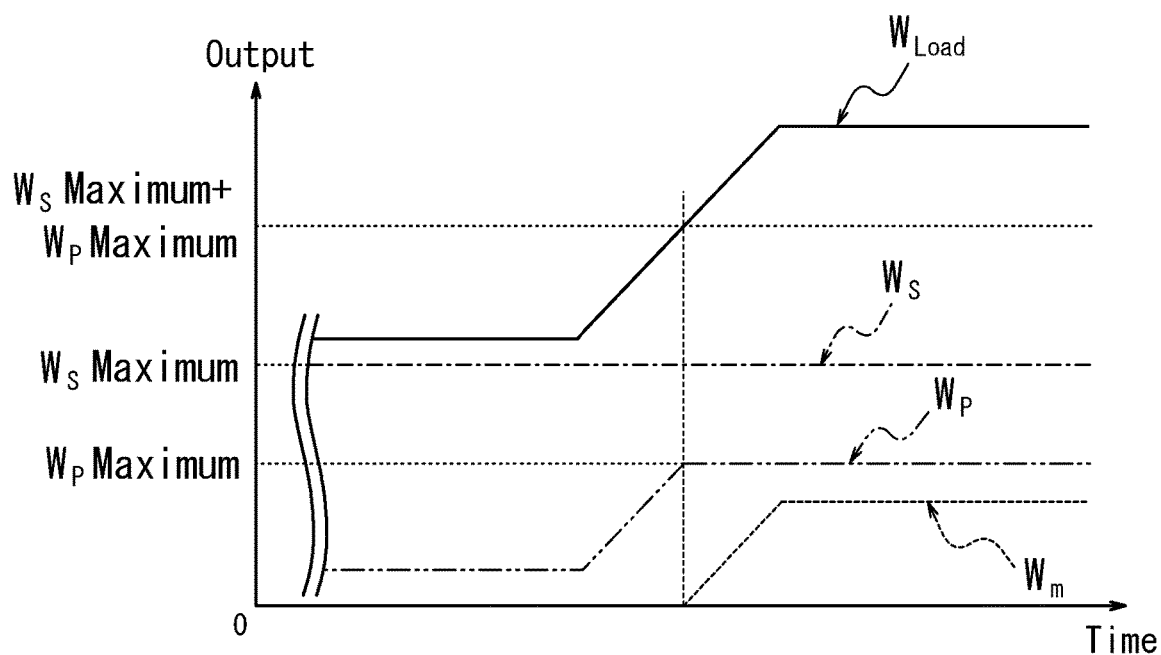
FIG. 5 illustrates another example of operations of a power supply apparatus according to one of the embodiments of the present disclosure.
Figure 6:
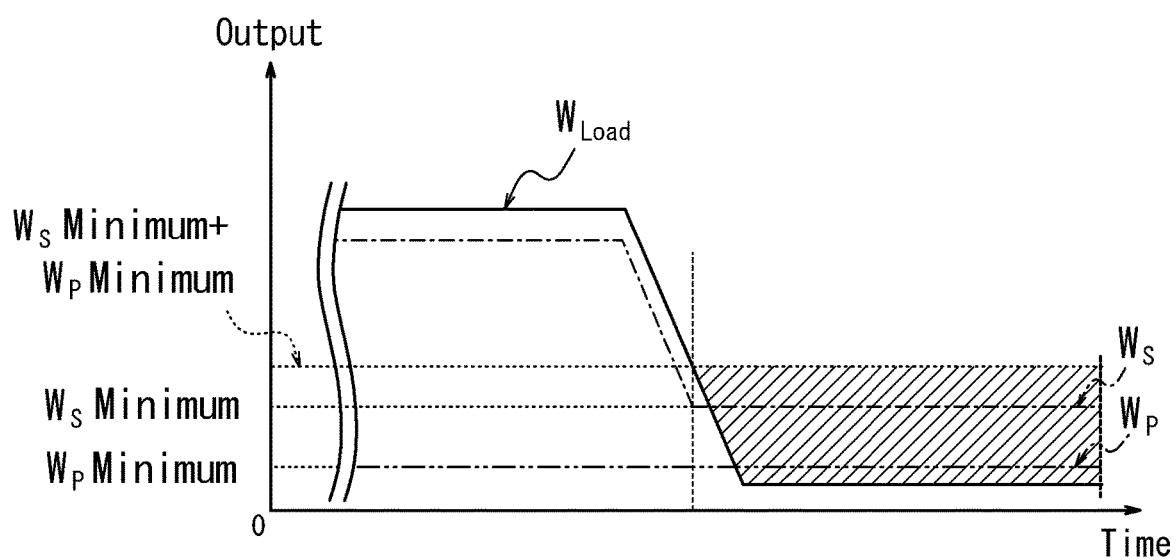
FIG. 6 illustrates another example of operations of a power supply apparatus according to one of the embodiments of the present disclosure.

Next, the case of the power consumption of the load 200 changing in this embodiment is described. The meaning of the labels in FIG. 4 to FIG. 6 is the same as in FIG. 2.

First, the case of the power consumption of the load 200 changing in a range between the maximum output of the SOFC 20A and the PEFC 20B and the minimum output of the SOFC 20A and the PEFC 20B is described.

Figure 4:
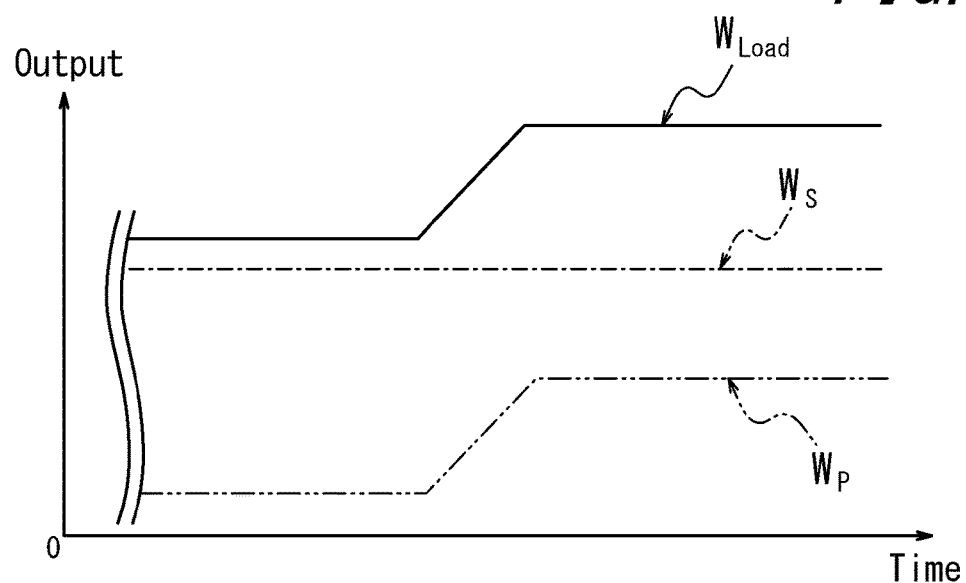
FIG. 4 illustrates another example of operations of a power supply apparatus according to one of the embodiments of the present disclosure.

FIG. 4 illustrates control performed in the power supply system 1 when the load 200 changes.

After controlling the output of the SOFC 20A and the PEFC 20B for example by the control at the time of startup illustrated in FIG. 3, suppose that at a certain timing, the power consumption of the load 200 (Wload) changes, as illustrated in FIG. 4. In FIG. 4, the power consumption of the load 200 (Wload) increases partway through. In such a case, the controller 18 performs control so that the SOFC 20A with high power generation efficiency reaches maximum output. The controller 18 also performs control for the PEFC 20B to perform load following to cover the amount by which the power consumption of the load 200 increased. In FIG. 4, the output power Ws of the SOFC 20A is maintained at the maximum, whereas the output power Wp of the PEFC 20B increases by following the increasing power consumption of the load 200 (Wload). If the power consumption of the load 200 (Wload) decreases partway through, the controller 18 can perform control to maintain the SOFC 20A with high power generation efficiency at maximum output and for the PEFC 20B to perform load following for the amount by which the power consumption of the load 200 decreased.

In this way, when the power consumption of the load 200 is greater than the maximum output power of whichever of the plurality of power source units 60A and 60B has the highest power generation efficiency (for example, 60A), then the controller 18 may perform control so that the power source unit (60A) with the highest power generation efficiency reaches the maximum output. At this time, the controller 18 may perform control for a power source unit (for example, 60B) other than the power source unit with the highest power generation efficiency (60A) to perform load following.

Next, the case of the power consumption of the load 200 changing to exceed the maximum output of the SOFC 20A and the PEFC 20B is described.

FIG. 5 illustrates control in the power supply system 1 when the load 200 changes to exceed the maximum output of the SOFC 20A and the PEFC 20B.

For example as illustrated in FIG. 5, suppose that at a certain timing, the power consumption of the load 200 (Wload) increases and exceeds the maximum output of the SOFC 20A and the PEFC 20B. In FIG. 5, the power consumption of the load 200 (Wload) increases partway through and exceeds the maximum output of the SOFC 20A and the PEFC 20B (Ws maximum+Wp maximum). In such a case, the controller 18 performs control so that the SOFC 20A with high power generation efficiency reaches maximum output, and so that the PEFC 20B also reaches maximum output. For the amount by which the power consumption of the load 200 exceeds the maximum output of the SOFC 20A and the PEFC 20B, the controller 18 for example performs control to compensate with the power output by the solar cell 22 and/or the rechargeable battery 24. In FIG. 5, the output power Ws of the SOFC 20A is maintained at the maximum, and the output power Wp of the PEFC 20B is also increased to the maximum. Furthermore, in FIG. 5, with regard to the amount lacking after adding the power output Ws of the SOFC 20A and the power output Wp of the PEFC 20B, the power consumption of the load 200 (Wload) is compensated for by the power (Wm) output by the solar cell 22 and/or the rechargeable battery 24.

In this way, when the power consumption of the load 200 is greater than the maximum output power of all of the plurality of power source units 60A and 60B, then the controller 18 may perform control so that all of the plurality of power source units 60A and 60B reach the maximum output. At this time, the controller 18 may also perform control so that power output by the distributed power sources (for example, 22 and 24) other than the plurality of power source units 60A and 60B is supplied to the load 200.

Next, the case of the power consumption of the load 200 changing to fall below the minimum output of the SOFC 20A and the PEFC 20B is described.

FIG. 6 illustrates control in the power supply system 1 when the load 200 changes to fall below the minimum output of the SOFC 20A and the PEFC 20B.

For example as illustrated in FIG. 6, suppose that at a certain timing, the power consumption of the load 200 (Wload) decreases and falls below the minimum output of the SOFC 20A and the PEFC 20B. In FIG. 6, the power consumption of the load 200 (Wload) decreases partway through and falls below the minimum output of the SOFC 20A and the PEFC 20B (Ws minimum+Wp minimum). In this case, the controller 18 performs control so that the SOFC 20A and the PEFC 20B provide the minimum output. The controller 18 then performs control for example to charge the rechargeable battery 24 with the amount by which the power consumption of the load 200 falls below the minimum output of the SOFC 20A and the PEFC 20B. In FIG. 6, the output power Wp of the PEFC 20B is maintained at the minimum, and the output power Ws of the SOFC 20A is reduced to the minimum. Furthermore, the amount by which the power consumption of the load 200 (Wload) falls below the minimum output of the SOFC 20A and the PEFC 20B (Ws minimum+Wp minimum) in FIG. 6 (the hatched portion in FIG. 6) can be used to charge the rechargeable battery 24.

In this way, when the power consumption of the load 200 is less than the minimum output power of all of the plurality of power source units 60A and 60B, then the controller 18 may perform control so that all of the plurality of power source units 60A and 60B provide the minimum output. At this time, the controller 18 may also perform control so that surplus power output by the plurality of power source units 60A and 60B is used to charge the rechargeable battery 24 included in the plurality of distributed power sources.

The following describes control for performing the operations of the power supply system 1 according to this embodiment as described with reference to FIGS. 3 to 6.

Figure 7:
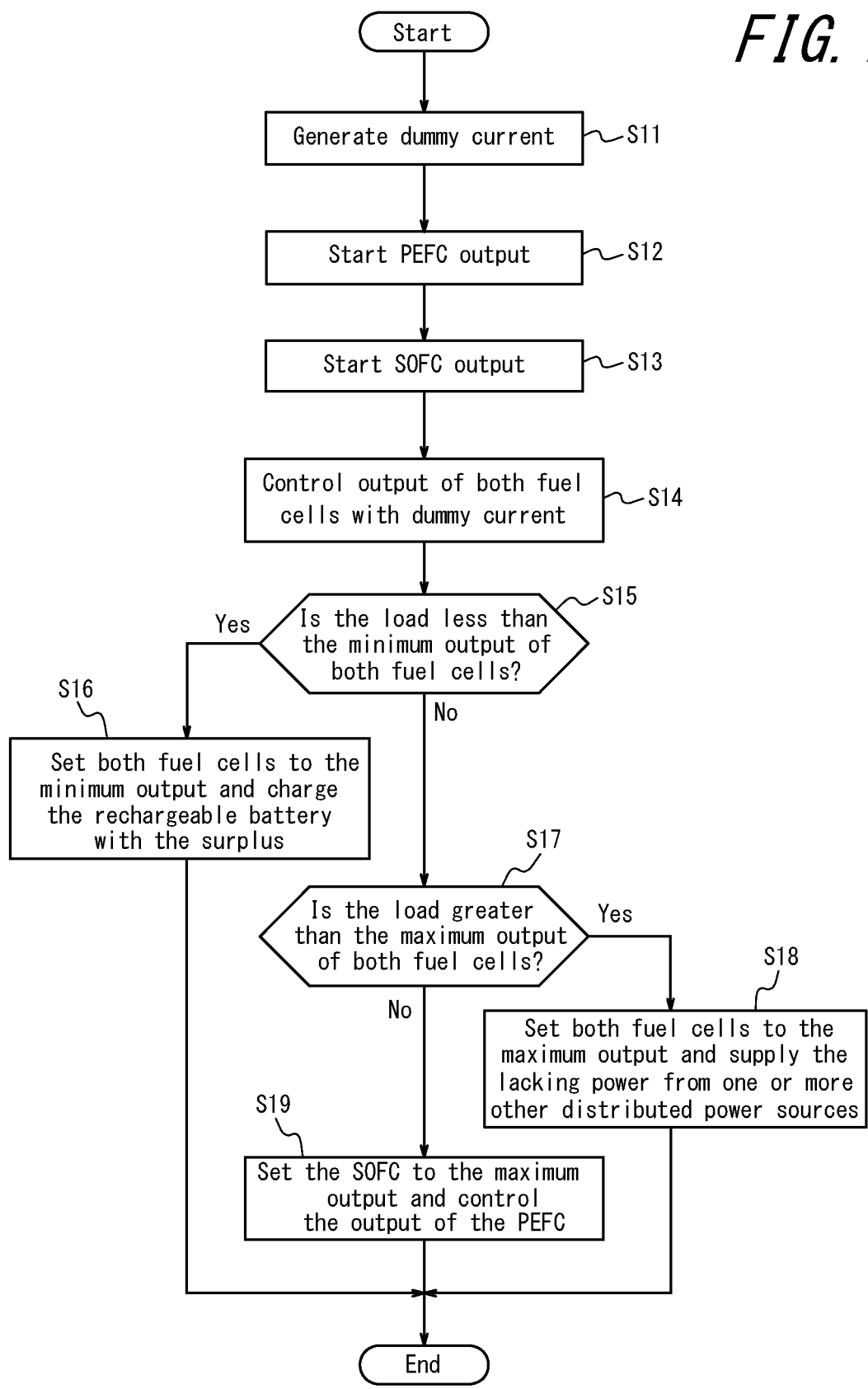
FIG. 7 is a flowchart illustrating operations of a power supply apparatus according to one of the embodiments of the present disclosure.

FIG. 7 is a flowchart illustrating control performed by the power supply apparatus 5 during operations of the power supply system 1.

The trigger for starting the control illustrated in FIG. 7 may be envisioned as, for example, the point in time at which the power supply system 1 begins independent operation after the suspension of power supply from the grid 100 due to a power outage or other cause. When the power supply system 1 begins independent operation and the control illustrated in FIG. 7 starts, the controller 18 of the power supply apparatus 5 performs control so that the dummy current generation circuit 30 generates a dummy current (step S11). In greater detail, as described above, the controller 18 controls the dummy current generation circuit 30 by, for example, changing the resistance of the variable resistors 34 and 36 to cause the dummy current generation circuit 30 to generate a current (dummy current) detected by the current sensors CT1 and CT2.

Upon a dummy current being generated in step S11, the current sensors CT1 and CT2 detect current in the forward power flow direction. As a result, the SOFC 20A and the PEFC 20B initiate startup. As described above, the PEFC 20B has a faster startup rate than the SOFC 20A. Therefore, the PEFC 20B finishes starting up earlier than the SOFC 20A and can start to output power. Therefore, the PEFC 20B first starts to output power (step S12), and the SOFC 20A subsequently starts to output power (step S13).

Once the SOFC 20A also starts to output power in step S13, the controller 18 controls the output power of each of the SOFC 20A and the PEFC 20B by adjusting the dummy current generated by the dummy current generation circuit 30 (step S14). Based on the control in step S14, operations such as those illustrated in FIG. 3 for example are performed.

After step S14, the controller 18 determines whether the power consumption of the load 200 is less than the minimum output of the SOFC 20A and the PEFC 20B (step S15).

In step S15, when the power consumption of the load 200 is less than the minimum output of the SOFC 20A and the PEFC 20B, then the controller 18 performs control to set the SOFC 20A and the PEFC 20B to the minimum output and to charge the rechargeable battery 24 with the surplus power (step S16). Here as well, the controller 18 controls the output of the SOFC 20A and the PEFC 20B by adjusting the dummy current generated by the dummy current generation circuit 30. Based on the control in step S16, operations such as those illustrated in FIG. 6 for example are performed.

In step S15, when the power consumption of the load 200 is not less than the minimum output of the SOFC 20A and the PEFC 20B, then the controller 18 determines whether the power consumption is greater than the maximum output of the SOFC 20A and the PEFC 20B (step S17).

In step S17, when the power consumption of the load 200 is greater than the maximum output of the SOFC 20A and the PEFC 20B, then the controller 18 performs control to set the SOFC 20A and the PEFC 20B to the maximum output (step S18). In step S18, the controller 18 performs control to supply the power that is lacking, even when the SOFC 20A and the PEFC 20B are at maximum output, from the solar cell 22 and/or the rechargeable battery 24. Here as well, the controller 18 controls the output of the SOFC 20A and the PEFC 20B by adjusting the dummy current generated by the dummy current generation circuit 30. Based on the control in step S18, operations such as those illustrated in FIG. 5 for example are performed.

In step S17, when the power consumption of the load 200 is not greater than the maximum output of the SOFC 20A and the PEFC 20B, then the controller 18 performs control to set the SOFC 20A to the maximum output (step S19). In step S19, the controller 18 causes the output power of the PEFC 20B to perform load following so as to compensate for the amount of power lacking with only the output power of the SOFC 20A. Here as well, the controller 18 controls the output of the SOFC 20A and the PEFC 20B by adjusting the dummy current generated by the dummy current generation circuit 30. Based on the control in step S19, operations such as those illustrated in FIG. 4 for example are performed.

In this way, in this embodiment, control can be performed so that a power source unit with high power generation efficiency, such as the power source unit 60A included in the SOFC 20A, is always prioritized to have high output (preferably, the maximum output). Therefore, according to this embodiment, the power generation efficiency of the system overall in a system that includes a plurality of power source units can be increased.

Also, according to this embodiment, by combined use of a plurality of fuel cells with other distributed power sources, a large effect of increasing the amount of power sold can be expected. For example, in this embodiment, other than the SOFC 20A and the PEFC 20B, the solar cell 22 is also used to supply power. Therefore, by prioritizing consumption by the load 200 of the power generated by the SOFC 20A and the PEFC 20B, the power generated by the solar cell 22 can be sold to the grid 100. In such a configuration, by adopting a plurality of fuel cells such as the SOFC 20A and the PEFC 20B, the effect of increasing the amount of power sold can be heightened.

Also, in a power supply system that is provided with a solar cell and/or a rechargeable battery, the effect of guaranteeing power from the solar cell and/or the rechargeable battery during independent operation can be expected. Power generation by a solar cell is affected by the weather, however, and there is also a limit to the power charged in the rechargeable battery. Therefore, in such a power supply system, it is difficult to supply power for an extended period of time. In this embodiment, fuel cells such as the SOFC 20A and the PEFC 20B are used. Therefore, in the power supply system 1 according to this embodiment, steady power can be guaranteed as long as the gas and the like necessary for power generation by the fuel cell are supplied.

Although the present disclosure is based on the accompanying drawings and on examples, it is to be noted that various changes and modifications will be apparent to those skilled in the art based on the present disclosure. Therefore, such changes and modifications are to be understood as included within the scope of the present disclosure. For example, the functions and the like included in the various functional components, means, and steps may be reordered in any logically consistent way. Furthermore, functional components or steps may be combined into one or divided. The above embodiments of the present disclosure are not limited to being implemented precisely as described and may be implemented by combining or partially omitting the features thereof.

The present disclosure is not limited to the power supply apparatus 5 and may also be implemented as the power supply system 1 that includes the power supply apparatus 5. In this case, the system 1 is configured to include a plurality of distributed power sources including a plurality of power source units 60A and 60B, and the power supply apparatus 5 that operates the plurality of distributed power sources in parallel and supplies the output power from the plurality of distributed power sources to the load 200. In this system, the power supply apparatus 5 is provided with the controller 18 that controls the output power from each of the plurality of power source units 60A and 60B so that output from whichever of the plurality of power source units 60A and 60B has higher power generation efficiency (for example, 60A) is prioritized to increase.

Furthermore, the present disclosure may be implemented as a power supply method in a power supply system such as the power supply system 1 described above. In this case, the method includes a step of operating a plurality of distributed power sources including a plurality of power source units 60A, 60B in parallel, a step of supplying output power from the plurality of distributed power sources to the load 200, and a step of controlling output power from each of the plurality of power source units 60A, 60B so that output from whichever of the plurality of power source units 60A and 60B has higher power generation efficiency (for example, 60A) is prioritized to increase.

Much of the subject matter of the present disclosure is described as a series of operations executed by a computer system and other hardware that can execute program instructions. Examples of the computer system and other hardware include a general-purpose computer, a Personal Computer (PC), a dedicated computer, a workstation, a Personal Communications System (PCS), an electronic notepad, a laptop computer, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of each of the following: a microprocessor, a central processing unit (CPU), an Application Specific Integrated Circuit (ASIC), a Digital Signal Processor (DSP), a Programmable Logic Device (PLD), a Field Programmable Gate Array (FPGA), a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

The machine-readable, non-transitory storage medium used here may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, or another magnetic or optical storage medium (such as a Compact Disc (CD), Digital Versatile Disc (DVD®), and Blu-Ray Disc® (DVD and Blu-ray disc are each a registered trademark in Japan, other countries, or both)), portable computer disk, Random Access Memory (RAM), Read-Only Memory (ROM), rewritable programmable ROM such as EPROM, EEPROM, or flash memory, another tangible storage medium that can store information, or a combination of any of these. The memory may be provided internal and/or external to a processor/processing unit. As used in the present disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

1 Power supply system
5 Power supply apparatus
10 Inverter
12, 14, 16 Switch
18 Controller
20A Solid oxide fuel cell (SOFC)
20B Polymer electrolyte fuel cell (PEFC)
22 Solar cell
24 Rechargeable battery
30 Dummy current generation circuit
32 Dummy current supply
34, 36 Variable resistor
50 Distribution board
60A Power source unit
60B Power source unit
100 Grid
200 Load
CT1-CT5 Current sensor

The invention claimed is:
1. A power supply system comprising:
a plurality of distributed power sources including a plurality of power source units; and
a power supply apparatus configured to operate the plurality of distributed power sources in parallel and to supply output power from the plurality of distributed power sources to a load;
wherein the power supply apparatus comprises a controller programmed
to control, for a predetermined time from startup of the plurality of power source units until a time at which a total output power from the plurality of power source units reaches a power consumption of the load, each power source unit so that output power from whichever of the plurality of power source units has a shorter startup time is prioritized to increase, and
to control, after the predetermined time has passed, each power source unit so that output power from whichever of the plurality of power source units has higher power generation efficiency is prioritized to increase.

2. The power supply system of claim 1, wherein the plurality of power source units output power while current sensors respectively connected to the plurality of power source units detect current of forward power flow; and wherein the controller controls each power source unit by controlling current detected by each of the current sensors during independent operation of the power supply apparatus.

3. The power supply system of claim 1, wherein when a power consumption of the load is greater than a maximum output power of a power source unit with a highest power generation efficiency among the plurality of power source units, the controller controls the power source unit with the highest power generation efficiency to reach maximum output and controls a power source unit other than the power source unit with the highest power generation efficiency to perform load following.

4. The power supply system of claim 1, wherein when a power consumption of the load is greater than a maximum output power of all of the plurality of power source units, the controller controls all of the plurality of power source units to reach maximum output and controls a distributed power source other than the plurality of power source units to supply output power to the load.

5. A power supply system comprising:
a plurality of distributed power sources including a plurality of power source units; and
a power supply apparatus configured to operate the plurality of distributed power sources in parallel and to supply output power from the plurality of distributed power sources to a load;
wherein the power supply apparatus comprises a controller programmed
to control, for a predetermined time from startup of the plurality of power source units until a time at which a total output power from the plurality of power source units reaches a threshold power, each power source unit so that output power from whichever of the plurality of power source units has a shorter startup time is prioritized to increase, and
to control, after the predetermined time has passed, each power source unit so that output power from whichever of the plurality of power source units has higher power generation efficiency is prioritized to increase.

6. The power supply system of claim 1, wherein a power source unit of higher power generation efficiency is a Solid Oxide Fuel Cell (SOFC), and a power source unit of lower power generation efficiency is a Polymer Electrolyte Fuel Cell (PEFC).

* * * * *